United States Patent
Kawasaki

(10) Patent No.: US 10,914,649 B1
(45) Date of Patent: Feb. 9, 2021

(54) IONIZATION GAUGE AND CARTRIDGE

(71) Applicant: Canon Anelva Corporation, Kawasaki (JP)

(72) Inventor: Yohsuke Kawasaki, Yamanashi-ken (JP)

(73) Assignee: CANON ANELVA CORPORATION, Kawasaki (JP)

( * ) Notice: Subject to any disclaimer, the term of this patent is extended or adjusted under 35 U.S.C. 154(b) by 0 days.

(21) Appl. No.: 17/060,436

(22) Filed: Oct. 1, 2020

Related U.S. Application Data

(63) Continuation of application No. PCT/JP2019/036187, filed on Sep. 13, 2019.

(51) Int. Cl.
    *G01L 21/34*     (2006.01)
    *H01J 41/06*     (2006.01)
    *G01L 19/06*     (2006.01)

(52) U.S. Cl.
    CPC .............. *G01L 21/34* (2013.01); *G01L 19/06* (2013.01); *H01J 41/06* (2013.01)

(58) Field of Classification Search
    CPC ........... G01L 21/34; G01L 19/06; H01J 41/06
    USPC ....................................................... 324/464
    See application file for complete search history.

(56) References Cited

U.S. PATENT DOCUMENTS

| | | | |
|---|---|---|---|
| 9,671,302 B2 | 6/2017 | Brucker et al. | |
| 2010/0301869 A1* | 12/2010 | Kawasaki | G01L 21/34 |
| | | | 324/460 |
| 2014/0368210 A1* | 12/2014 | Enomoto | G01L 21/34 |
| | | | 324/460 |
| 2018/0259417 A1* | 9/2018 | Kawasaki | G01L 21/34 |

FOREIGN PATENT DOCUMENTS

| | | |
|---|---|---|
| JP | 2008304360 A | 12/2008 |
| JP | 4905704 B2 | 3/2012 |
| JP | 5170768 B2 | 3/2013 |
| JP | 5579038 B2 | 8/2014 |

OTHER PUBLICATIONS

International Search Report (PCT/ISA/210) dated Oct. 8, 2019, by the Japanese Patent Office as the International Searching Authority for International Application No. PCT/JP2019/036187.
Written Opinion (PCT/ISA/237) dated Oct. 8, 2019, by the Japanese Patent Office as the International Searching Authority for International Application No. PCT/JP2019/036187.

* cited by examiner

*Primary Examiner* — Melissa J Koval
*Assistant Examiner* — Rahul Maini
(74) *Attorney, Agent, or Firm* — Buchanan Ingersoll & Rooney PC

(57) ABSTRACT

An ionization gauge includes an anode having a rod shape, and a cathode including a cathode plate having a through hole through which the anode extends. A shape of the through hole on a section along an axial direction of the anode includes a concave portion sandwiched between two convex portions.

22 Claims, 7 Drawing Sheets

IONIZATION GAUGE AND CARTRIDGE

CROSS-REFERENCE TO RELATED APPLICATION(S)

This application is a continuation of International Patent Application No. PCT/JP2019/036187 filed on Sep. 13, 2019, the entire disclosures of which is incorporated herein by reference.

BACKGROUND OF THE INVENTION

Field of the Invention

The present invention relates to an ionization gauge and a cartridge.

Description of the Related Art

In an ionization gauge, a gas is ionized by applying a voltage between an anode and a cathode and thus causing discharge, and a current flowing between the cathode and the anode is measured to detect a pressure. The ionization gauge can be provided with an inducing unit configured to promote discharge between the anode and the cathode.

Japanese Patent Laid-Open No. 2008-304360 describes a cold cathode ionization gauge including a vacuum gauge main body in which a discharge space is defined, an electrode installed in the discharge space, and an auxiliary ignition device. The auxiliary ignition device includes a base portion supported by the vacuum gauge main body, a through hole formed in the base portion to pass the electrode, and one or a plurality of projecting portions that project from the inner peripheral surface of the through hole toward the electrode in a section orthogonal to the axial direction of the electrode. However, in long-time use, substances may be deposited on the surfaces of the projecting portions, and discharge may be difficult to be induced.

SUMMARY OF INVENTION

The present invention provides a technique advantageous in suppressing lowering of discharge inducing performance in an ionization gauge.

According to the first aspect of the present invention, there is provided an ionization gauge comprising an anode having a rod shape, and a cathode including a cathode plate including a through hole through which the anode extends, wherein a shape of the through hole on a section along an axial direction of the anode includes a concave portion sandwiched between two convex portions.

According to the second aspect of the present invention, there is provided an ionization gauge comprising an anode having a rod shape, and a cathode including a cathode plate including a through hole through which the anode extends, wherein the anode includes, in a portion facing the cathode plate, a concave portion sandwiched between two convex portions on a section along an axial direction of the anode.

According to the third aspect of the present invention, there is provided an ionization gauge comprising an anode having a rod shape, a cathode, and an electromagnetic wave source, wherein the cathode includes a first cathode plate including a through hole through which the anode extends, and a storage portion configured to store the electromagnetic wave source, a second cathode plate arranged separately from the first cathode plate, a third cathode plate arranged between the first cathode plate and the second cathode plate to be in contact with the first cathode plate, and a member configured to surround the first cathode plate, the second cathode plate, and the third cathode plate, a gap is formed between the member and the third cathode plate so that an electromagnetic wave generated by the electromagnetic wave source is transmitted to a discharge space surrounded by the second cathode plate, the third cathode plate, and the member, and on a section along an axial direction of the anode, a shape of a portion of the member, which forms the gap, includes a concave portion sandwiched between two convex portions.

According to the fourth aspect of the present invention, there is provided a cartridge used in an ionization gauge including an anode having a rod shape, wherein the cartridge comprises a cathode plate including a through hole through which the anode extends, and a shape of the through hole on a section along an axial direction of the anode includes a concave portion sandwiched between two convex portions.

According to the fifth aspect of the present invention, there is provided a cartridge used in an ionization gauge including an anode having a rod shape, and an electromagnetic wave source, wherein the cartridge comprises a first cathode plate including a through hole through which the anode extends, and a storage portion configured to store the electromagnetic wave source, a second cathode plate arranged separately from the first cathode plate, a third cathode plate arranged between the first cathode plate and the second cathode plate to be in contact with the first cathode plate, and a member configured to surround the first cathode plate, the second cathode plate, and the third cathode plate, a gap is formed between the member and the third cathode plate so that an electromagnetic wave generated by the electromagnetic wave source is transmitted to a discharge space surrounded by the second cathode plate, the third cathode plate, and the member, and on a section along an axial direction of the anode, a shape of a portion of the member, which forms the gap, includes a concave portion sandwiched between two convex portions.

Further features of the present invention will become apparent from the following description of exemplary embodiments with reference to the attached drawings.

DESCRIPTION OF EMBODIMENTS

Figure 1:
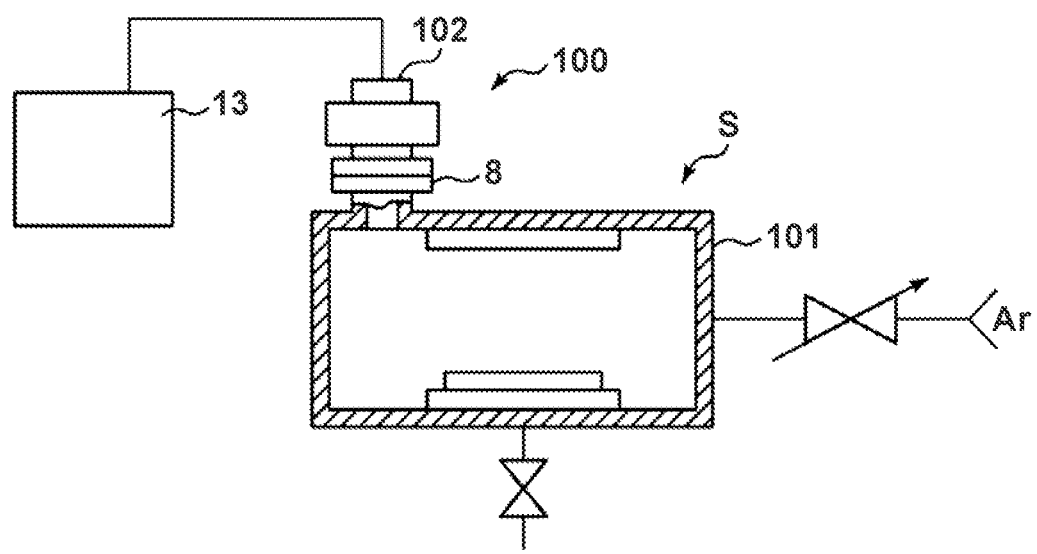
FIG. 1 is a view showing a vacuum processing apparatus according to an embodiment and an ionization gauge attached to it.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

FIG. 1 shows a vacuum processing apparatus S according to an embodiment and an ionization gauge 100 attached to it. The vacuum processing apparatus S can be, for example, a deposition apparatus. Examples of the deposition apparatus are a sputtering apparatus, a PVD apparatus, and a CVD apparatus. The vacuum processing apparatus S may be a surface processing or treatment apparatus such as an ashing apparatus or a dry etching apparatus.

The ionization gauge 100 can include a probe 102, and a controller 13 connected to the probe 102. The vacuum processing apparatus S includes a vacuum container 101, and can process a processing target object such as a substrate in the vacuum container 101. The probe 102 is attached to an opening portion provided in the wall of the vacuum container 101 while holding airtightness. In an example, the probe 102 can be connected via a flange 8 of the vacuum container 101. The controller 13 and the probe 102 may be configured to be separable from each other or may be integrated.

Figure 2:
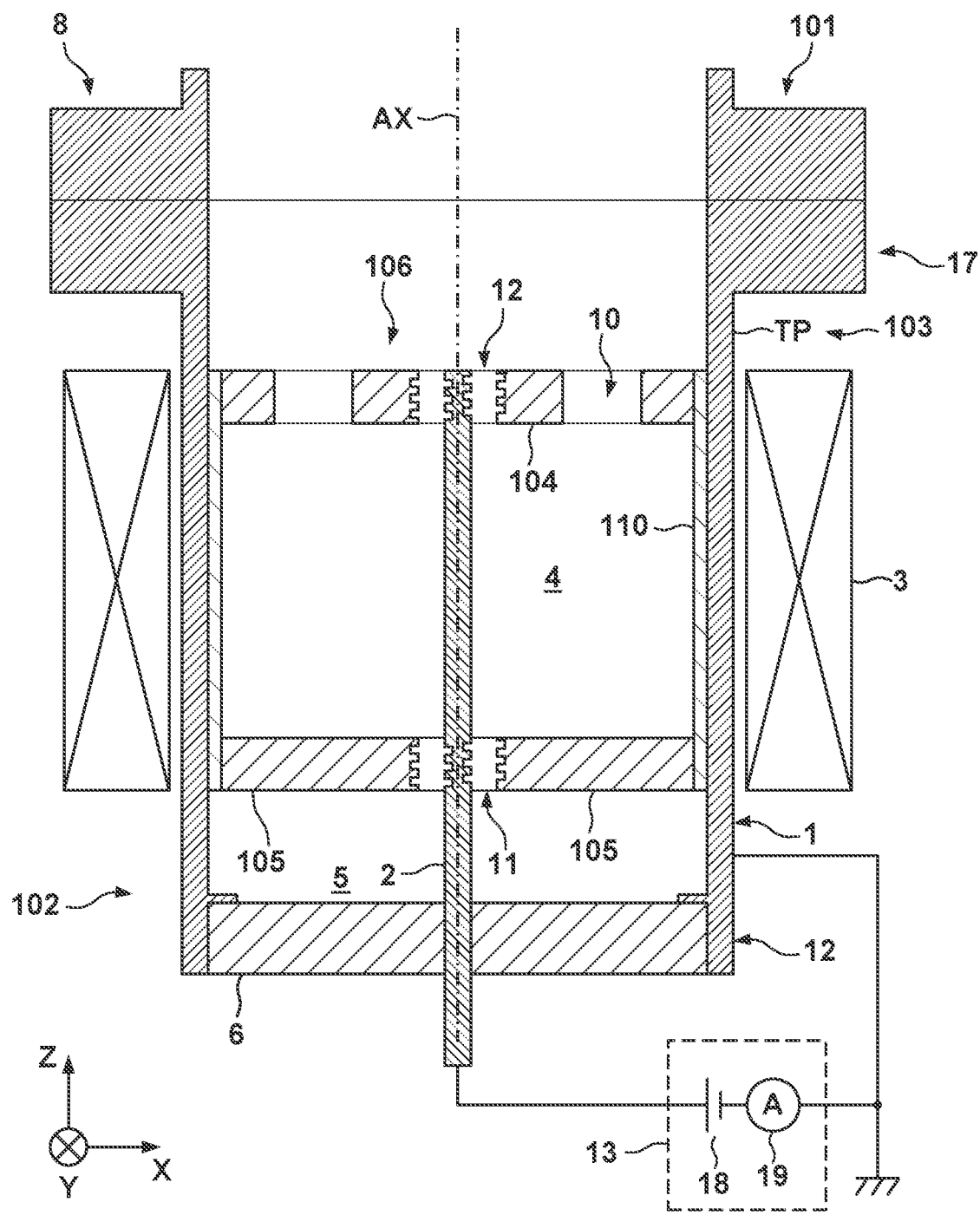
FIG. 2 is a view showing the arrangement of an ionization gauge according to the first embodiment.

FIG. 2 shows the arrangement of an ionization gauge 100 according to the first embodiment. The ionization gauge 100 can be configured as, for example, a reverse magnetron type gauge, but is not limited to this. A probe 102 can include a container 103 that forms a cathode 1, and an anode 2. The container 103 that forms the cathode 1 can include, for example, a tubular portion TP having a tubular shape such as a cylindrical shape. The anode 2 can have a rod shape. The cathode 1 can be arranged to surround the rod-shaped anode 2. A discharge space 4 can be defined by the anode 2 and the cathode 1. The container 103 can be made of a conductor such as a metal (for example, stainless steel). The anode 2 can be made of a conductor such as a metal (for example, molybdenum, tungsten, nickel, or titanium). The probe 102 can further include a magnet 3 that forms a magnetic field. The magnet 3 can be arranged to surround the tubular portion TP, and can have a ring shape. The magnet 3 can be, for example, a permanent magnet such as a ferrite magnet. One end (the side of the vacuum container 101) of the tubular portion TP of the container 103 can be opened, and the other end of the tubular portion TP can be sealed by an insulating sealing member 6. In an example, the anode 2 can be arranged to extend through the sealing member 6. The sealing member 6 can be made of, for example, alumina ceramic.

An exchangeable cartridge 106 may be arranged in the container 103. The cartridge 106 can be a consumable component usable in the ionization gauge 100. The cartridge 106 can be, for example, a cathode structure. The cartridge 106 can include pole pieces (cathode plates) 104 and 105, and an inner tube 110. The pole pieces 104 and 105 can have a function of adjusting a magnetic field, and a function of surrounding the discharge space 4. The inner tube 110 can include an outer surface that is in contact with the inner surface of the container 103, and an inner surface surrounding the discharge space 4, and can support the pole pieces 104 and 105. The pole pieces 104 and 105 and the inner tube 110 can be made of a conductor such as a metal. The conductor that can form the pole pieces 104 and 105 may be a magnetic material (for example, stainless steel having magnetism), or may be a nonmagnetic material (for example, stainless steel that has no magnetism).

The cartridge 106 is electrically connected to the tubular portion TP, and the pole pieces 104 and 105 and the inner tube 110 can form parts of the cathode 1. If the cartridge 106 has degraded due to collision of ions or the like against the cartridge 106, the degraded cartridge 106 is exchanged with a new cartridge 106, thereby recovering the function of the ionization gauge 100. In this example, the cartridge 106 is exchangeable. However, the cartridge 106 may be inseparably coupled with the tubular portion TP.

The pole piece (first cathode plate) 105 can include a through hole 11 through which the anode 2 extends. The through hole 11 is provided so that the pole piece 105 and the anode 2 are not electrically connected to each other. That is, the through hole 11 is provided so that a gap is formed between the pole piece 105 and the anode 2.

The pole piece (second cathode plate) 104 is arranged separately from the pole piece 105, and the discharge space 4 can be defined between the pole piece 105 and the pole piece 104. The pole piece 105 can be arranged between the pole piece 104 and the sealing member 6. The pole piece 105 can be arranged at an end of the inner tube 110 (an end on the side of the sealing member 6). The pole piece 104 can be arranged at the other end of the inner tube 110 (an end on the side of the open end of the tubular portion TP). The pole piece 104 includes one or a plurality of through holes 10, and the vacuum container 101 and the discharge space 4 communicate with each other via the one or the plurality of through holes 10. The inner tube 110 can be made of the same material as the pole pieces 105 and 104.

The anode 2 is electrically connected to the controller 13. The controller 13 can include a power supply 18 configured to apply a voltage to the anode 2, and a current detector 19 configured to measure a discharge current flowing between the anode 2 and the cathode 1. The discharge current detected by the current detector 19 has a correlation with the pressure in the discharge space 4, and the pressure can be calculated by a processor (not shown) based on the correlation. The pressure in the vacuum container 101 can thus be detected.

Figure 3:
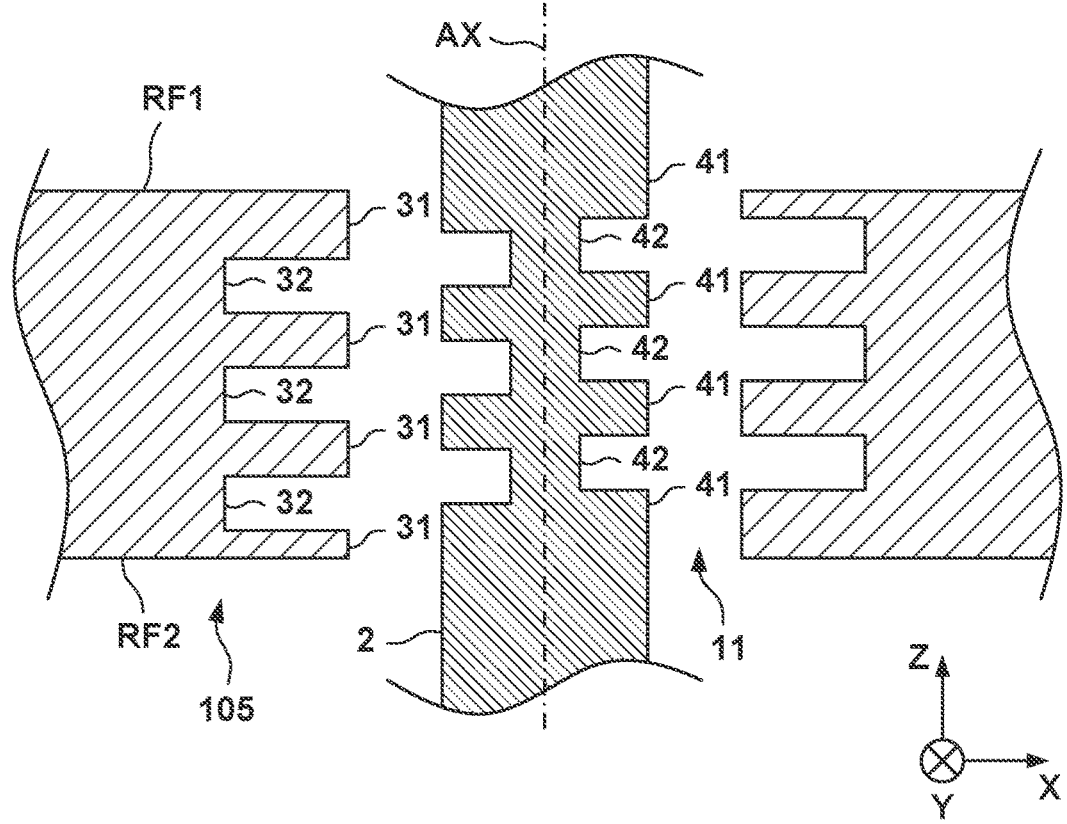
FIG. 3 is a view showing the arrangement of the ionization gauge according to the first embodiment.

FIG. 3 is a sectional view of the anode 2 and the pole piece 105 taken along an axial direction AX of the anode 2. FIG. 3 shows the structure of the through hole 11 of the pole piece 105 according to the first embodiment. The shape of the through hole 11 of the pole piece 105 on the section along the axial direction AX of the anode 2 can include a concave portion 32 sandwiched between two convex portions 31. This structure can be called an uneven structure. On the section along the axial direction AX of the anode 2, the shape of the through hole 11 may be a shape including a plurality of concave portions 32.

In an example, the through hole 11 can include a plurality of grooves arranged in the axial direction AX, and one of the plurality of grooves can form one concave portion 32. In another example, the through hole 11 can include a helical groove that forms the concave portion 32. The pole piece 105 includes a first ring surface RF1 and a second ring surface RF2 on the opposite side of the first ring surface RF1. The concave portion 32 can be arranged between a virtual plane including the first ring surface RF1 and a virtual plane including the second ring surface RF2. As shown in FIG. 3, the anode 2 can also have an uneven structure. That is, on the section along the axial direction AX of the anode 2, the anode 2 may include a concave portion 42 sandwiched between two convex portions 41 in a portion facing the pole piece 105.

Particles generated by sputtering the cathode 1 (mainly the cartridge 106) facing the discharge space 4 may be deposited on the surfaces of the cathode 1 and the anode 2 to form films thereon. When a concave portion sandwiched between two convex portions is provided in the portion where the cathode 1 and the anode 2 face each other, as described above, it is possible to suppress lowering of discharge inducing performance, which is caused by the formation of the film. As the first reason for this, when a concave portion sandwiched between two convex portions is provided in the portion where the cathode 1 and the anode 2 face each other, the surface area of the portion increases. As the second reason, when a concave portion sandwiched between two convex portions is provided in the portion where the cathode 1 and the anode 2 face each other on the section along the axial direction AX, deposition of particles on the concave portion is suppressed.

In the first embodiment shown in FIG. 3, on the section along the axial direction AX, the through hole 11 of the pole piece 105 includes the concave portion 32 sandwiched between the two convex portions 31, and the anode 2 includes the concave portion 42 sandwiched between the two convex portions 41. However, it is only necessary that at least one of the through hole 11 of the pole piece 105 and the anode 2 includes a concave portion sandwiched between two convex portions on the section along the axial direction AX.

An uneven structure may be provided in a portion where the pole piece 104 and the anode 2 face each other in addition to or in place of the through hole 11 of the pole piece 105 and/or a portion of the anode 2 facing the pole piece 105. As shown in FIG. 2, the shape of a through hole 12 of the pole piece 104 on the section along the axial direction AX of the anode 2 can include a concave portion sandwiched between two convex portions. On the section along the axial direction AX of the anode 2, the shape of the through hole 12 may be a shape including a plurality of concave portions. In addition to or in place of this, the anode 2 may include a concave portion sandwiched between two convex portions in the portion facing the pole piece 104 on the section along the axial direction AX of the anode 2.

Figure 4:
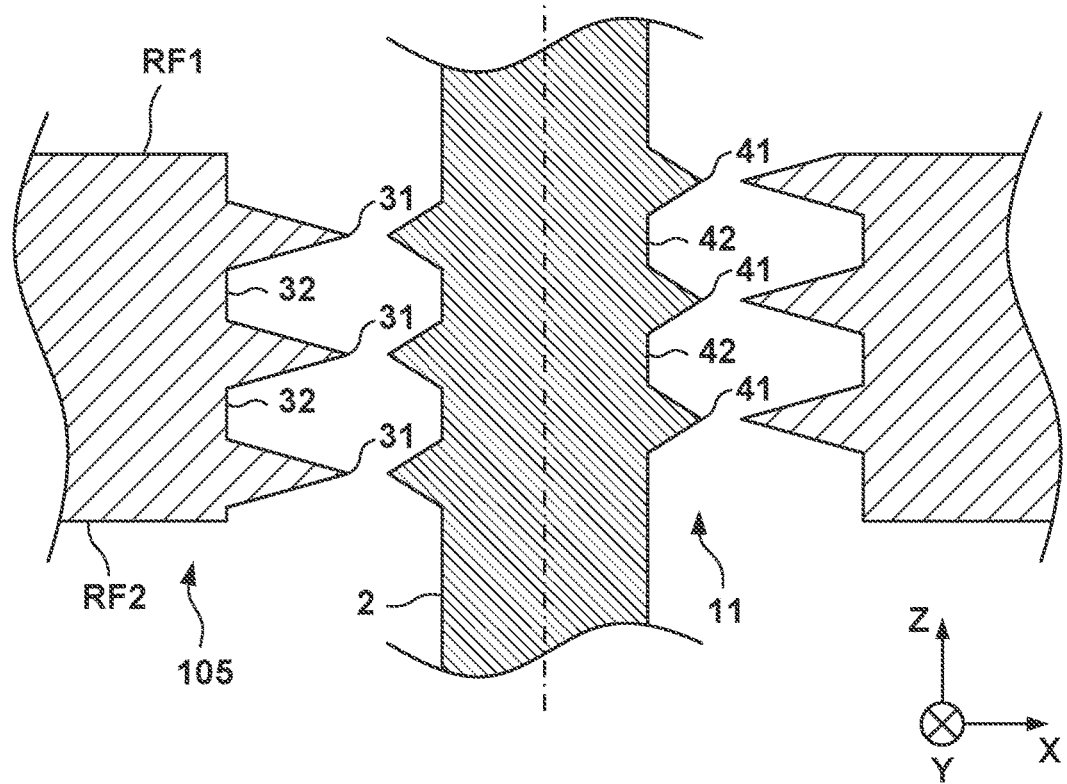
FIG. 4 is a view showing the arrangement of an ionization gauge according to the second embodiment.

FIG. 4 is a sectional view of an anode 2 and a pole piece 105 taken along an axial direction AX of the anode 2. FIG. 4 shows the structure of a through hole 11 of the pole piece 105 according to the second embodiment. Matters that are not mentioned as the second embodiment can comply with the first embodiment. In the second embodiment, the pole piece 105 can have, on the section along the axial direction AX of the anode 2, an uneven structure in which at least one convex portion 31 has a tapered shape that becomes narrower toward the anode 2. In addition to or in place of this, in the second embodiment, the anode 2 may have, on the section along the axial direction AX of the anode 2, an uneven structure in which at least one convex portion 41 has a tapered shape that becomes narrower toward the pole piece 105. Such convex portions 31 and 41 are advantageous in increasing the generation amount of electrons because an electric field readily concentrates to the distal ends.

The uneven structure according to the second embodiment may be provided in a portion where a pole piece 104 and the anode 2 face each other in addition to or in place of the uneven structure of the pole piece 105 and/or the anode 2 facing it. For example, the shape of the through hole 12 of the pole piece 104 on the section along the axial direction AX of the anode 2 can include a concave portion sandwiched between two convex portions, and at least one of the two convex portions can have a tapered shape that becomes narrow toward the anode 2. In addition, the anode 2 may include a concave portion sandwiched between two convex portions in the portion facing the pole piece 104 on the section along the axial direction AX of the anode 2, and at least one of the two convex portions may have a tapered shape that becomes narrow toward the pole piece 104.

Figure 5:
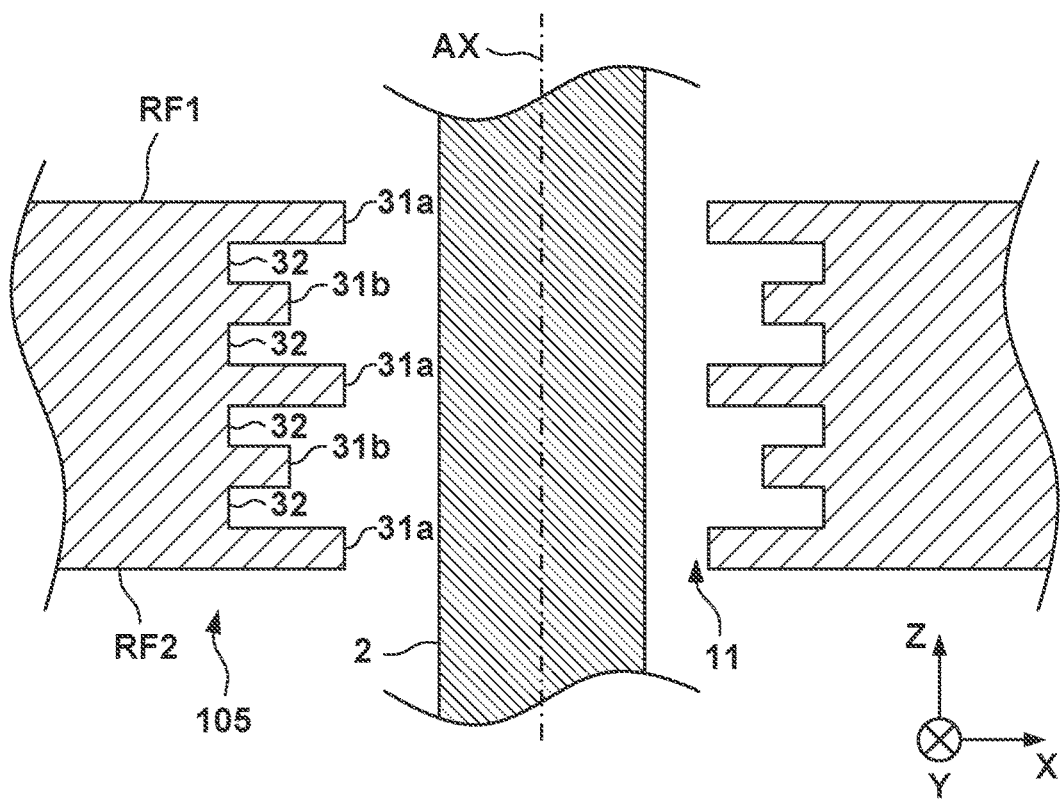
FIG. 5 is a view showing the arrangement of an ionization gauge according to the third embodiment.

FIG. 5 is a sectional view of an anode 2 and a pole piece 105 taken along an axial direction AX of the anode 2. FIG. 5 shows the structure of a through hole 11 of the pole piece 105 according to the third embodiment. Matters that are not mentioned as the third embodiment can comply with the first or second embodiment. In the third embodiment, the shape of the through hole 11 of the pole piece 105 on the section along the axial direction AX of the anode 2 can include a concave portion 32 sandwiched between two convex portions 31$a$ and 31$b$. The convex portions 31$a$ and 31$b$ that are adjacent to each other have different distances up to the anode 2, and the distance between the convex portion 31$a$ and the anode 2 is shorter than the distance between the convex portion 31$b$ and the anode 2. The convex portions 31$a$ and 31$b$ having different distances up to the anode 2 can alternately be arranged along the axial direction AX. At least one convex portion 31$a$ of the through hole 11 is preferably arranged at a position close to a discharge space 4 as compared to at least one convex portion 31$b$ of the through hole 11. Additionally, at least one convex portion 31$a$ of the through hole 11 is more preferably arranged at a position close to the discharge space 4 as compared to all convex portions 31$b$ of the through hole 11.

On the convex portion 31$b$ whose distance up to the anode 2 is long, formation of a film by particle deposition hardly occurs as compared to the convex portion 31$a$ whose distance up to the anode 2 is short. Hence, in the third embodiment, the convex portion 31$b$ with a long distance to the anode 2 is provided, thereby increasing the surface area of the convex portion on which a film is hardly formed. This is advantageous in prolonging life and/or improving discharge inducing performance.

Figure 6:
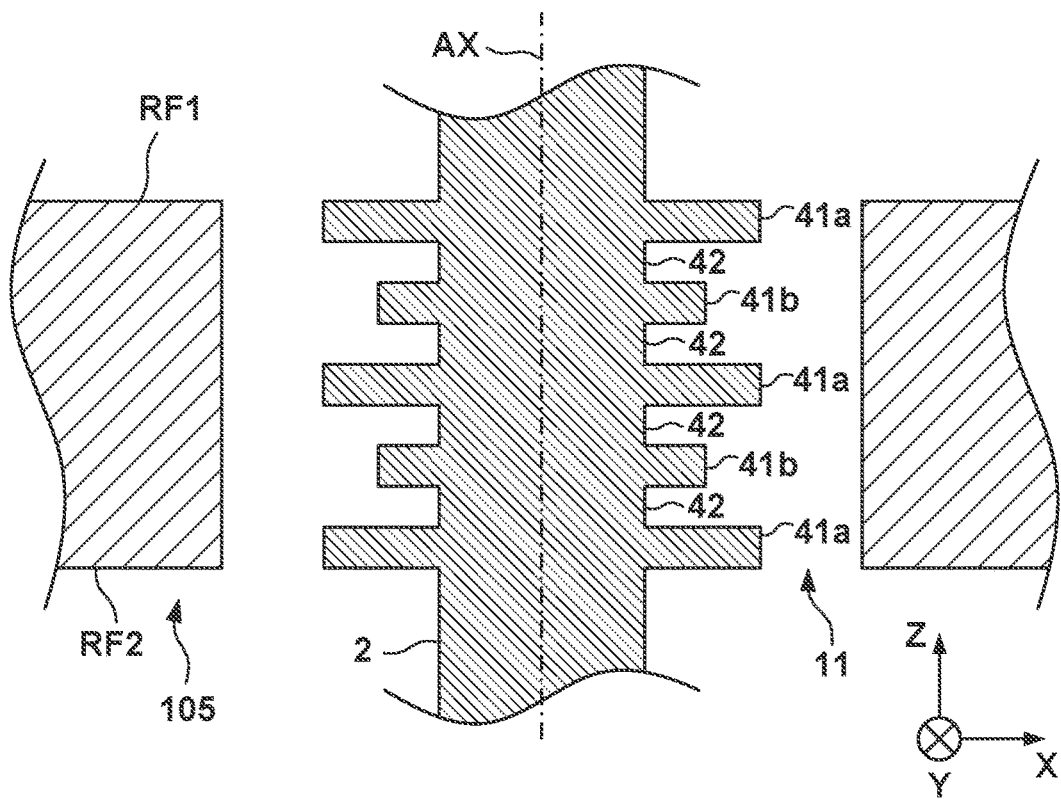
FIG. 6 is a view showing the arrangement of an ionization gauge according to the fourth embodiment.

FIG. 6 is a sectional view of an anode 2 and a pole piece 105 taken along an axial direction AX of the anode 2. FIG. 6 shows the structure of a through hole 11 of the pole piece 105 according to the fourth embodiment. Matters that are not mentioned as the fourth embodiment can comply with the first to third embodiments. In the fourth embodiment, the shape of the anode 2 on the section along the axial direction AX of the anode 2 can include a concave portion 42 sandwiched between two convex portions 41$a$ and 41$b$. The convex portions 41$a$ and 41$b$ that are adjacent to each other have different distances up to the pole piece 105, and the distance between the convex portion 41$a$ and the pole piece 105 is shorter than the distance between the convex portion 41$b$ and the pole piece 105. The convex portions 41$a$ and 41$b$ having different distances up to the pole piece 105 can alternately be arranged along the axial direction AX. At least one convex portion 41$a$ is preferably arranged at a position close to a discharge space 4 as compared to at least one convex portion 41$b$. Additionally, at least one convex portion 41$a$ is more preferably arranged at a position close to the discharge space 4 as compared to all convex portions 41$b$. On the convex portion 41$b$ whose distance up to the pole piece 105 is long, formation of a film by particle deposition hardly occurs as compared to the convex portion 41$a$ whose distance up to the pole piece 105 is short. Hence, in the fourth embodiment, the convex portion 41$b$ with a long distance to the pole piece 105 is provided, thereby increasing the surface area of the convex portion on which a film is hardly formed. This is advantageous in prolonging life and/or improving discharge inducing performance. The fourth embodiment may be implemented in combination with the third embodiment.

Figure 7:
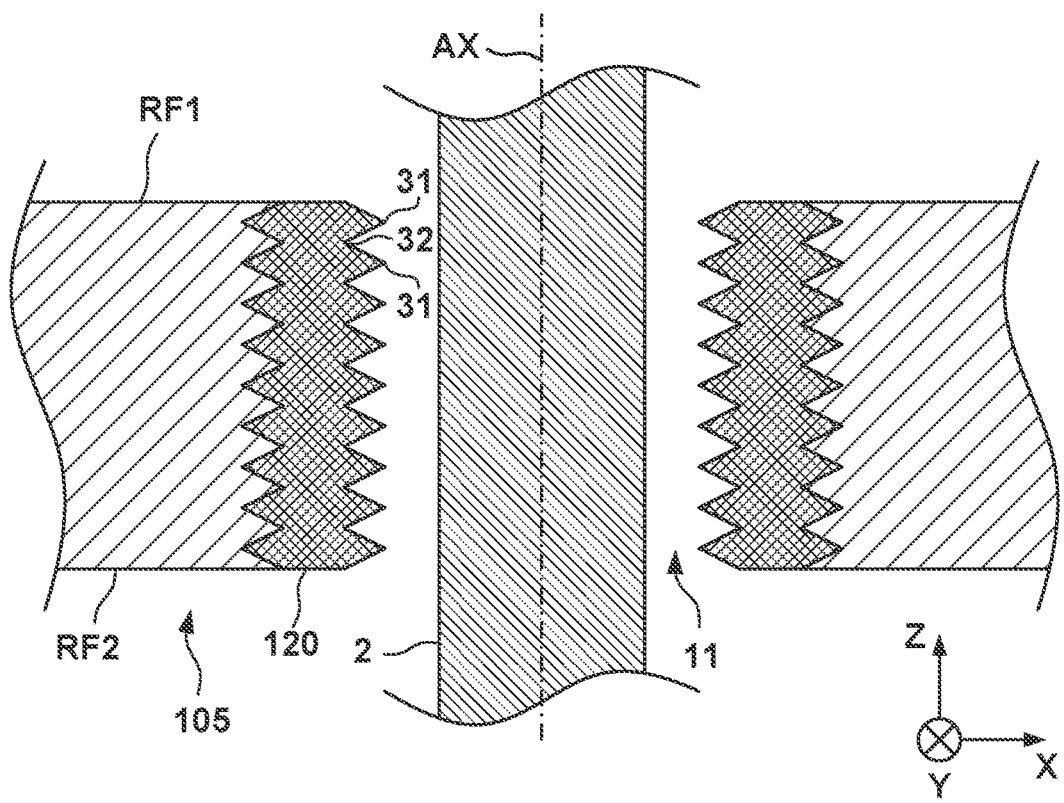
FIG. 7 is a view showing the arrangement of an ionization gauge according to the fifth embodiment.

FIG. 7 is a sectional view of an anode 2 and a pole piece 105 taken along an axial direction AX of the anode 2. FIG. 7 shows the structure of a through hole 11 of the pole piece 105 according to the fifth embodiment. Matters that are not mentioned as the fifth embodiment can comply with the first to fourth embodiments. Collision of ions against the surface of the through hole 11 is less than collision of ions against a first ring surface RF1 of the pole piece 105. Hence, formation of a film caused by particle deposition on the surface of the through hole 11 may occur more easily than formation of a film caused by particle deposition on the first ring surface RF1 of the pole piece 105. In the fifth embodiment, a component 120 that forms the surface of the through hole 11 is exchangeably attached to the pole piece 105. The component 120 can include, for example, a male screw, and the pole piece 105 can include an opening that receives the component 120, and a female screw provided on the opening. The component 120 can include the through hole 11, and the through hole 11 can be provided with an uneven structure according to any one of the first to fourth embodiments. The exchangeable component 120 may be provided to a pole piece 104.

Figure 8:
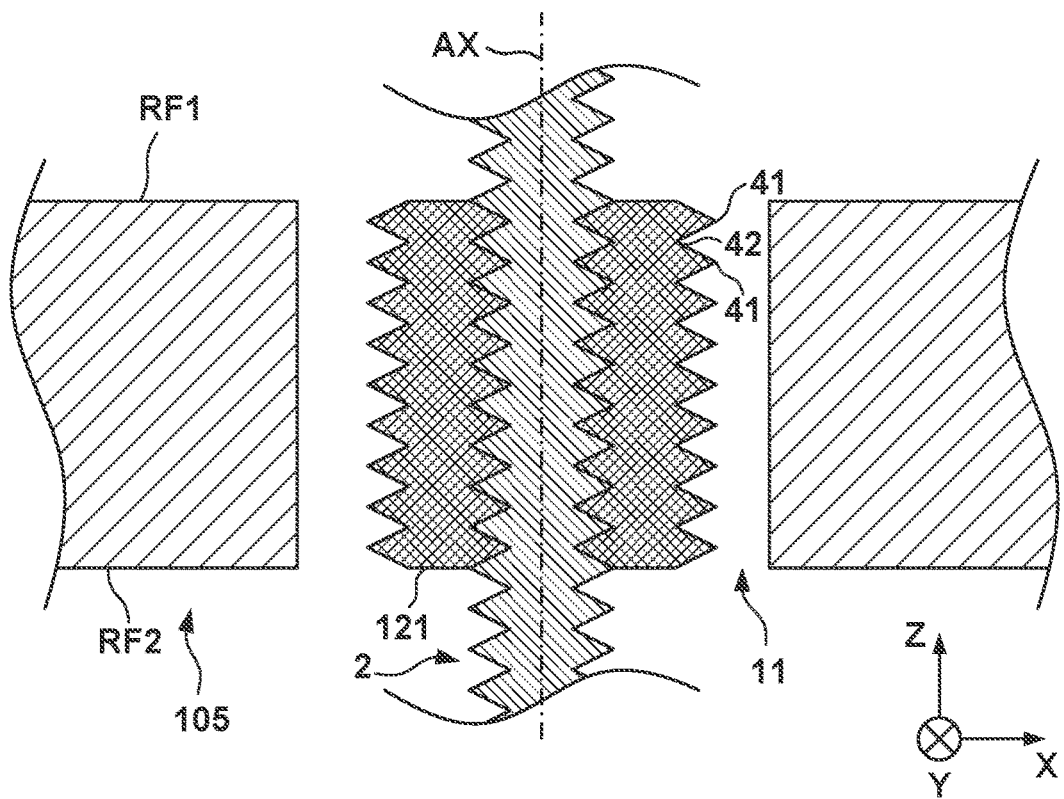
FIG. 8 is a view showing the arrangement of an ionization gauge according to the sixth embodiment.

FIG. 8 is a sectional view of an anode 2 and a pole piece 105 taken along an axial direction AX of the anode 2. FIG. 8 shows the structure of a through hole 11 of the pole piece 105 according to the sixth embodiment. Matters that are not mentioned as the sixth embodiment can comply with the first to fifth embodiments. In the sixth embodiment, a component 121 that forms the surface of a portion of the anode 2 facing the pole piece 105 is exchangeably attached to the anode 2. The component 121 can include, for example, a female screw, and the anode 2 can include a male screw. The component 121 can be provided with an uneven structure according to any one of the first to fourth embodiments. The exchangeable component 121 may be provided to a portion of the anode 2 facing a pole piece 104.

Figure 9:
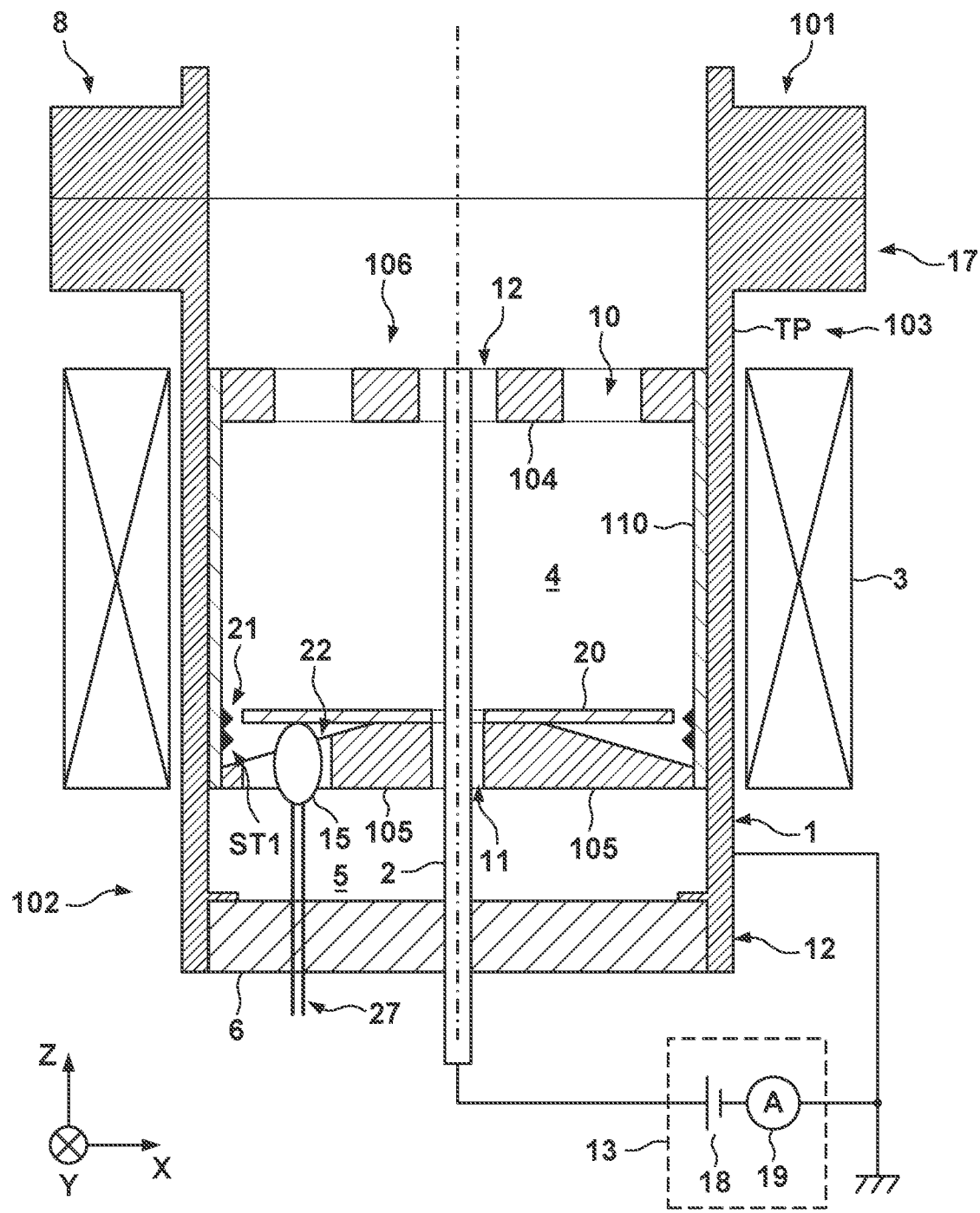
FIG. 9 is a view showing the arrangement of an ionization gauge according to the seventh embodiment.

FIG. 9 shows the arrangement of an ionization gauge 100 according to the seventh embodiment. Matters that are not mentioned as the seventh embodiment can comply with the first to sixth embodiments. A pole piece (first cathode plate) 105 can include a storage portion 22 that stores an electromagnetic wave source 15, in addition to a through hole 11 through which an anode 2 extends. The electromagnetic wave source 15 can be, for example, a light source. The pole piece 105 may be provided with a cover that covers the electromagnetic wave source 15.

A pole piece (second cathode plate) 104 is arranged separately from the pole piece 105, and a discharge space 4 can be defined between the pole piece 105 and the pole piece 104. The pole piece 105 can be arranged between the pole piece 104 and a sealing member 6. The pole piece 105 can be arranged at an end of an inner tube 110 (an end on the side of the sealing member 6). The pole piece 104 can be arranged at the other end of the inner tube 110 (on the side of the open end of a tubular portion TP). The pole piece 104 includes one or a plurality of through holes 10, and a vacuum container 101 and the discharge space 4 communicate via the one or the plurality of through holes 10.

A cartridge 106 or a cathode 1 can further include a cathode plate (third cathode plate) 20 between the pole piece 105 (first cathode plate) and the pole piece 104 (second cathode plate). The cathode plate 20 can be arranged to be in contact with the pole piece 105. The cathode plate 20 includes a through hole to pass the anode 2. The cathode plate 20 can be configured to transmit the electromagnetic wave generated by the electromagnetic wave source 15 to the discharge space 4 surrounded by the pole piece 104, the cathode plate 20, and the inner tube 110 (tubular portion TP). For example, the cathode plate 20 can be configured to form a gap 21 between the cathode plate 20 and the inner tube 110 and transmit, via the gap 21, the electromagnetic wave generated by the electromagnetic wave source 15 to the discharge space 4. A portion of the inner tube 110, where the electromagnetic wave generated by the electromagnetic wave source 15 enters, can generate electrons by a photoelectric effect. Such emission of electrons can improve discharge inducing performance. In addition to the electromagnetic wave generated by the electromagnetic wave source 15, electrons generated by electromagnetic wave irradiation on the portion of the inner tube 110 between the cathode plate 20 and the pole piece 105 can also be supplied to the discharge space 4 via the gap 21.

Particles that can form a film can fly to the gap 21. On the other hand, since ions that impede the film formation hardly collide, a film can be formed on the portion of the inner tube 110 (member), which forms the gap 21. Hence, an uneven structure ST1 according to any one of the first to fourth embodiments can be provided on the portion of the inner tube 110, which forms the gap 21. A film is hardly formed on the surface of the uneven structure ST1. It is therefore possible to maintain an electron radiation function by the photoelectric effect for a long time.

Figure 10:
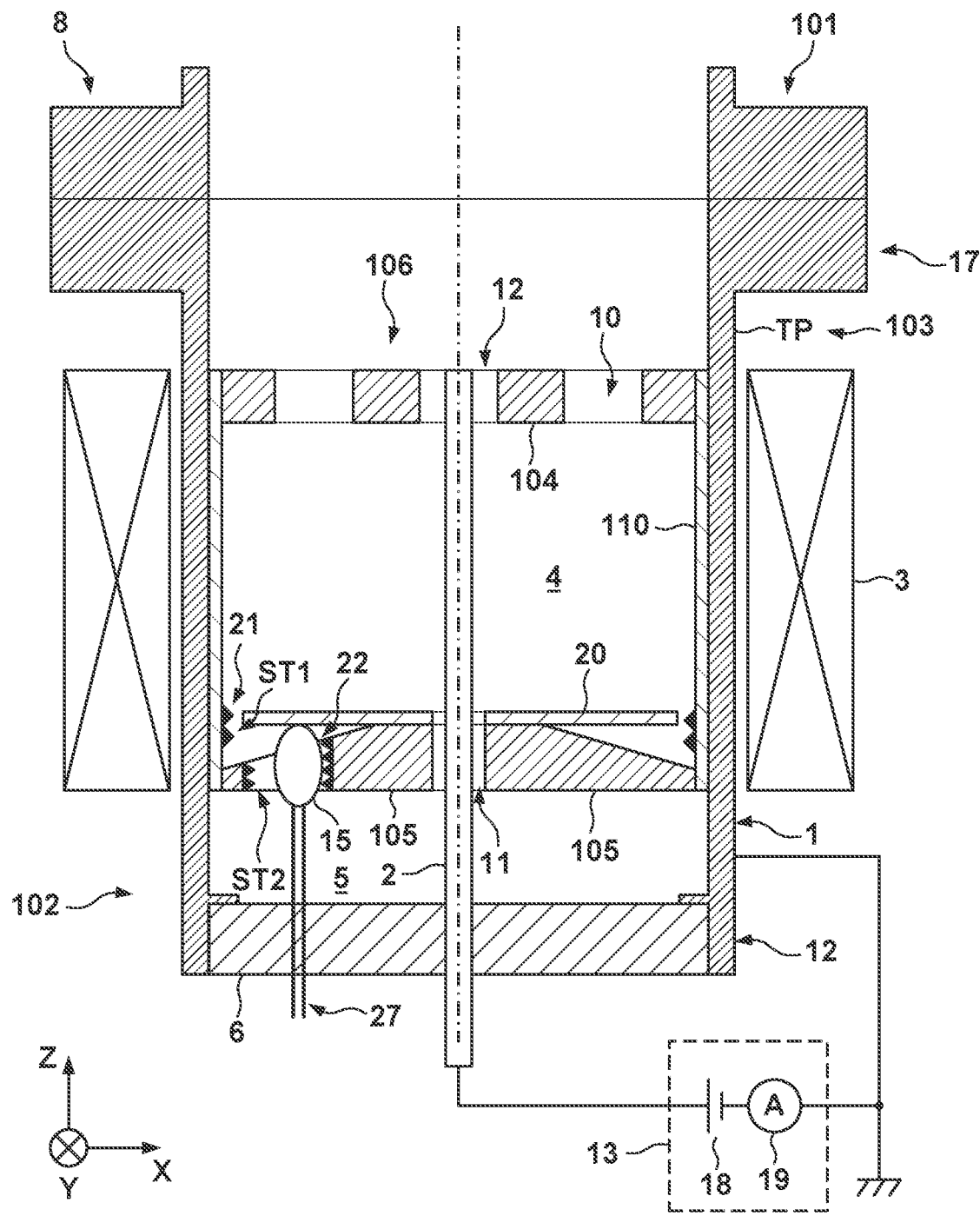
FIG. 10 is a view showing the arrangement of an ionization gauge according to the eighth embodiment.

FIG. 10 shows the arrangement of an ionization gauge 100 according to the eighth embodiment. The eighth embodiment is a modification or an improvement of the seventh embodiment. In the eighth embodiment, an uneven structure ST2 according to any one of the first to fourth embodiments is provided even on the whole or part of the surface of a storage portion 22 that stores an electromagnetic wave source 15. With the uneven structure ST2 as well, it is therefore possible to maintain an electron radiation function by the photoelectric effect for a long time.

The present invention is not limited to the above embodiments and various changes and modifications can be made within the spirit and scope of the present invention. Therefore, to apprise the public of the scope of the present invention, the following claims are made.

What is claimed is:

1. An ionization gauge comprising:
   an anode having a rod shape; and
   a cathode including a cathode plate including a through hole through which the anode extends,
   wherein a gas is ionized by applying a voltage between the anode and the cathode and thus causing discharge, and a current flowing between the cathode and the anode is measured to detect a pressure,
   wherein a shape of the through hole on a section along an axial direction of the anode includes at least one concave portion sandwiched between two adjacent convex portions in said axial direction,
   wherein said at least one concave portion sandwiched between said two adjacent convex portions suppresses a lowering of discharging inducing performance in the ionization gauge.

2. The ionization gauge according to claim 1, wherein the through hole includes a plurality of grooves arranged in the axial direction, and one of the plurality of grooves forms the at least one concave portion.

3. The ionization gauge according to claim 1, wherein the through hole includes a helical groove that forms the at least one concave portion.

4. The ionization gauge according to claim 1, wherein the two adjacent convex portions include a convex portion that becomes narrow toward the anode.

5. The ionization gauge according to claim 1, wherein the two adjacent convex portions include two convex portions whose distances up to the anode are different from each other.

6. The ionization gauge according to claim 1, wherein the cathode plate includes a first ring surface, and a second ring surface on an opposite side of the first ring surface, and the at least one concave portion is arranged between a virtual plane including the first ring surface and a virtual plane including the second ring surface.

7. The ionization gauge according to claim 1, wherein the anode includes, in a portion facing the through hole, at least one concave portion sandwiched between two adjacent convex portions.

8. The ionization gauge according to claim 1, wherein the cathode plate further includes another cathode plate including a through hole through which the anode extends, and
a shape of the through hole of the other cathode plate on the section along the axial direction of the anode includes at least one concave portion sandwiched between two adjacent convex portions.

9. The ionization gauge according to claim 8, wherein the anode includes, in a portion facing the through hole of the other cathode plate, at least one concave portion sandwiched between two adjacent convex portions.

10. An ionization gauge comprising an anode having a rod shape, and a cathode including a cathode plate including a through hole through which the anode extends,
wherein a gas is ionized by applying a voltage between the anode and the cathode and thus causing discharge, and a current flowing between the cathode and the anode is measured to detect a pressure,
wherein the anode includes, in a portion facing the cathode plate, at least one concave portion sandwiched between two adjacent convex portions on a section along an axial direction of the anode,
wherein said at least one concave portion sandwiched between said two adjacent convex portions suppresses a lowering of discharging inducing performance in the ionization gauge.

11. The ionization gauge according to claim 10, wherein the portion includes a plurality of grooves arranged in the axial direction, and one of the plurality of grooves forms the at least one concave portion.

12. The ionization gauge according to claim 10, wherein the portion includes a helical groove that forms the at least one concave portion.

13. The ionization gauge according to claim 10, wherein the two adjacent convex portions include a convex portion that becomes narrow toward the cathode.

14. The ionization gauge according to claim 10, wherein the two adjacent convex portions include two convex portions whose distances up to the cathode are different from each other.

15. The ionization gauge according to claim 10, wherein the cathode plate includes a first ring surface, and a second ring surface on an opposite side of the first ring surface, and the at least one concave portion is arranged between a virtual plane including the first ring surface and a virtual plane including the second ring surface.

16. A cartridge used in an ionization gauge including an anode having a rod shape, the cartridge comprising
a cathode plate including a through hole through which the anode extends,
wherein a gas is ionized by applying a voltage between the anode and the cathode plate and thus causing discharge, and a current flowing between the cathode plate and the anode is measured to detect a pressure,
wherein a shape of the through hole on a section along an axial direction of the anode includes at least one concave portion sandwiched between two adjacent convex portions in said axial direction,
wherein said at least one concave portion sandwiched between said two adjacent convex portions suppresses a lowering of discharging inducing performance in the ionization gauge.

17. The cartridge according to claim 16, wherein the through hole includes a plurality of grooves arranged in the axial direction, and one of the plurality of grooves forms the at least one concave portion.

18. The cartridge according to claim 16, wherein the through hole includes a helical groove that forms the at least one concave portion.

19. The cartridge according to claim 16, wherein the two adjacent convex portions include a convex portion that becomes narrow toward the anode.

20. The cartridge according to claim 16, wherein the two adjacent convex portions include two convex portions whose distances up to the anode are different from each other.

21. The cartridge according to claim 16, wherein the cathode plate includes a first ring surface, and a second ring surface on an opposite side of the first ring surface, and the at least one concave portion is arranged between a virtual plane including the first ring surface and a virtual plane including the second ring surface.

22. The cartridge according to claim 16, further comprising another cathode plate including a through hole through which the anode extends,
wherein a shape of the through hole of the other cathode plate on the section along the axial direction of the anode includes at least one concave portion sandwiched between two adjacent convex portions.

* * * * *